United States Patent
Kobayashi et al.

(10) Patent No.: US 6,235,429 B1
(45) Date of Patent: May 22, 2001

(54) ALKALINE DRY CELL

(75) Inventors: Kazunari Kobayashi; Yukihiro Ito, both of Takasaki (JP)

(73) Assignee: Toshiba Battery Co., Ltd., Tokyo (JP)

( * ) Notice: Subject to any disclaimer, the term of this patent is extended or adjusted under 35 U.S.C. 154(b) by 0 days.

(21) Appl. No.: 09/120,881

(22) Filed: Jul. 23, 1998

(30) Foreign Application Priority Data

Jul. 24, 1997 (JP) .................................................. 9-198068

(51) Int. Cl.⁷ .............................. H01M 6/04; H01M 4/50; H01M 4/42

(52) U.S. Cl. ........................ 429/224; 429/229; 429/206; 429/165; 429/60

(58) Field of Search .................................. 429/224, 206, 429/229, 165, 60

(56) References Cited

U.S. PATENT DOCUMENTS 5,300,371 * 4/1994 Tomantschger et al. .............. 429/60
5,340,666 * 8/1994 Tomantschger et al. .............. 429/59
5,424,145 * 6/1995 Tomantschger et al. .............. 429/57

* cited by examiner

*Primary Examiner*—Gabrielle Brouillette
*Assistant Examiner*—Tracy Dove
(74) *Attorney, Agent, or Firm*—Oblon, Spivak, McClelland, Maier & Neustadt, P.C.

(57) ABSTRACT

An alkaline dry cell includes an anode inside a cathode. The anode includes a metal anode current collector inside an gel anode, which has zinc alloy powder as an active material. The cathode includes a cathode depolarizing mixture, which has electrolytic manganese dioxide as an active material, in a closed-end metal cathode can. Small amounts of the active materials can be used economically. A theoretical capacity ratio ($N_E/P_E$) between the anode and the cathode is in a range of 1.0 to 1.20. A contact area ratio ($P_A/N_A$) between an anode-opposed area of the cathode depolarizing mixture and a contact area of the anode current collector against the gel anode is in a range of 1.82 to 8.24. A short charge-up time makes the alkaline dry cell suitable to power the flash of a camera.

10 Claims, 1 Drawing Sheet

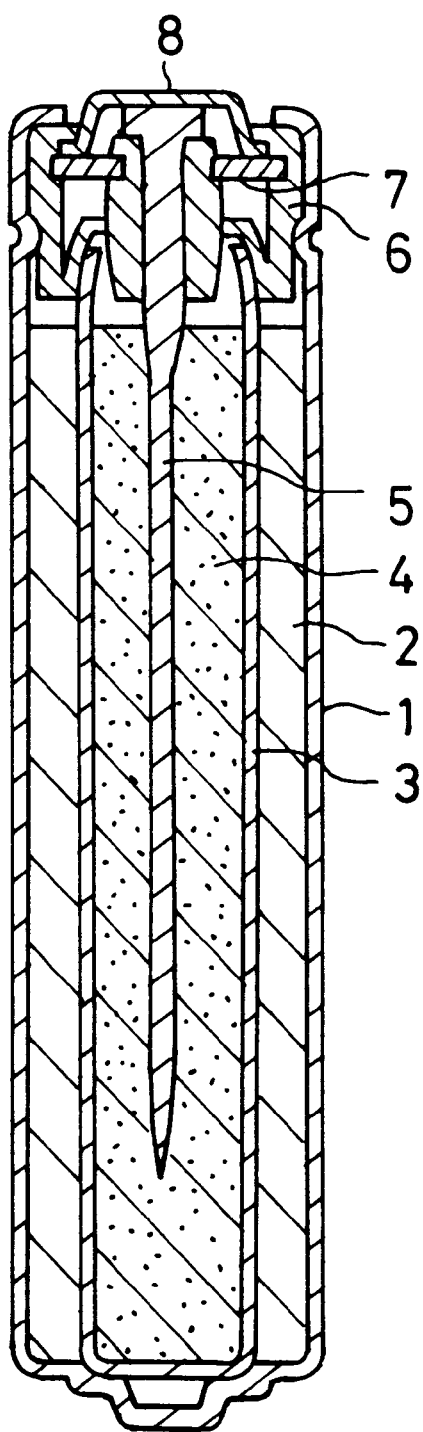
F I G. 1

ALKALINE DRY CELL

BACKGROUND OF THE INVENTION

1. Field of the Invention

The invention relates to an alkaline dry cell, and more particularly to an alkaline dry cell having characteristics particularly suitable as power for the flash of a camera.

2. Description of the Related Art

The alkaline dry cell is generally formed of a hollow cylindrically-formed cathode depolarizing mixture having electrolytic manganese dioxide as an active material and a gel anode having zinc alloy powder as an active material, which are placed with a cylindrical separator therebetween in a metallic cathode can which is a closed-end cylinder and doubles as a cathode terminal, and a metallic anode current collector which is inserted into the gel anode.

Recently, demands for the alkaline dry cell is sharply expanding with the increased use of various equipment and, researches are being made vigorously to increase its capacity. To increase the capacity, there is a method which, for example, increases the inner volume of the cell by making the cathode can and the separator thinner, so that an amount of the active material can be increased.

The alkaline dry cell has long been used as power for a remote control and a personal portable. In addition, a large demand is expected for the alkaline dry cell as power for a personal handy phone and the flash of a single-use camera in these years. To use the alkaline dry cell as power for the flash of a single-use camera, it is necessary to get a large current temporarily but an amount of the active material is not required to be increased largely. For example, cells now available on the market have a utilization factor of less than 30% of the active material. Thus, its utilization factor is small. Therefore, the improvement being made in the alkaline dry cell in these years, namely a method of increasing the inner capacity of the cell in order to increase the theoretical capacity, is not necessarily suitable to use it as power for the flash of a single-use camera.

In view of the aforementioned circumstances, the invention was achieved to provide an alkaline dry cell having performance particularly suitable as power for the flash of a single-use camera.

SUMMARY OF THE INVENTION

The invention relates to an alkaline dry cell, which is formed of a hollow cylindrically-formed cathode depolarizing mixture having electrolytic manganese dioxide as an active material and a gel anode having zinc alloy powder as an active material, which are placed with a cylindrical separator therebetween in a metallic cathode can which is a closed-end cylinder and doubles as a cathode terminal, and a metallic anode current collector which is inserted into the gel anode, wherein the electrolytic manganese dioxide is in an amount of 1.71 g or more, the zinc alloy powder is 0.65 g or more, a theoretical capacity ratio ($N_E/P_E$) between the anode and the cathode is in a range of 1.0 to 1.20, and an area ratio ($P_A/N_A$) between an anode-opposed area of the cathode depolarizing mixture and a contact area of the current collector against the gel anode is in a range of 1.82 to 8.24.

The conventional alkaline dry cell contains the cathode active material (electrolytic manganese dioxide) in an amount of about 3.5 g or more and the anode active material (zinc alloy powder) in an amount of about 1.5 g or more. As described above, the theoretical capacity of the cell as power for the flash is satisfactory in a half of a commercially available cell. In the present invention, electrolytic manganese dioxide is decreased to 1.71 g (value resulting from the conversion with purity set to 92%) or more and zinc alloy powder to 0.65 g or more, both smaller than they were used conventionally.

Since the active materials are decreased in their amounts, the formed cathode depolarizing mixture can be made to have a thinner wall, and the anode current collector can be made larger accordingly. Therefore, a contact area between the anode current collector and the gel anode can be increased. In the alkaline dry cell, the matallic anode current collector is generally made to have a rod shape. It is welded to a metal top of the anode terminal and inserted into the gel anode in order to take an electric current. In other words, the collector takes an electric current directly through its part which is in contact with the gel anode, so that an increase of the contact area with the gel anode is advantageous to take a large current. Therefore, the invention, which can have a large contact area between the anode current collector and the gel anode, is advantageous in taking a large current.

When a theoretical capacity ratio ($N_E/P_E$) between an anode theoretical capacity ($N_E$, Ah) and a cathode theoretical capacity ($P_E$, Ah) is 1.0 or below, a utilization ratio of the active materials decreases, so it is not practical. And when it exceeds 1.20, the cathode active material reacts excessively, and the anode active material and the current collector produce gas by their electrochemical reaction when the cathode reaction material has completed its reaction. These decreases a reliability of a dry cell.

And, when an area ratio ($P_A/N_A$) between an anode-opposed area ($P_A$) of the cathode depolarizing mixture and a contact area ($N_A$) of the anode current collector against the gel anode is larger than 8.24, the anode current collector has a lowered current collecting capacity, so that it is not practical. And, when the area ratio is less than 1.82, it is hard to have a required filling amount of the gel anode. Meanwhile, the conventional alkaline dry cell has an area ratio ($P_A/N_A$) of about 9.0 to 11.00.

DESCRIPTION OF THE PREFERRED EMBODIMENT

An AAA alkaline dry cell shown in FIG. 1 was produced. In the drawing, reference numeral 1 denotes a metal cathode can which is a closed-end cylinder and doubles as a cathode terminal, and its inner surface is coated with a layer mainly consisting of graphite as a conductive coating layer. The cathode can 1 is filled with a cathode depolarizing mixture 2 which is formed into a hollow cylinder under pressure. The cathode depolarizing mixture 2 is prepared by mixing electrolytic manganese dioxide and graphite powder, forming the mixture into a hollow cylinder under a predetermined pressure, and placing it in the cathode can 1. Then, a shaping rod having a larger diameter than the hollow part of the cathode depolarizing mixture 2 is inserted therein to intimately contact the cathode depolarizing mixture against the inner wall of the cathode can so to have an improved contact between the cathode depolarizing mixture and the cathode can.

A gel anode 4 is filled into the hollow part of the cathode depolarizing mixture 2 with a closed-end cylindrical separator 3 made of nonwoven cloth of acetallized polyvinyl alcohol therebetween. The gel anode 4 was prepared by uniformly mixing 0.50 part by weight of polyacrylic acid as a gelling agent, 30 parts by weight of non-mercury zinc alloy powder, and 16.5 parts by weight of an aqueous solution of 36 wt % potassium hydroxide (containing 2 wt % of ZnO). An anode current collector 5 is forced into the gel anode 4 so to extrude from the top end thereof. And, an open end of the cathode can 1 is bent inward to seal the cathode can 1 with an insulation gasket 6 and a metal top 8.

The current collector is a brass rod with its surface undergone electroless tin plating (an average thickness of 0.1 μm). And the metal cap 8 in the shape of a hat which doubles as an anode terminal is spot-welded to the top of the current collector, and a metal plate 7 in the shape of a ring is placed between the cap 8 and a double-ring part of the insulation gasket 6 to produce a current collecting structure.

As embodiments of the invention, AAA alkaline dry cells having the above-described structure were produced respectively to have an amount (g) of anode Zn (amount of zinc alloy powder), an amount (g) of cathode $MnO_2$, a theoretical capacity ratio ($N_E/P_E$), an area ratio ($P_A/N_A$) between an anode-opposed area ($P_A$) of a cathode depolarizing mixture and a contact area ($N_A$) of the anode current collector against the gel anode shown in Table 1. Dry cells were also produced as comparative and conventional embodiments with the various values as shown in Table 1.

The produced dry cells were tested as follows. Specifically, after leaving still at 20° C. for seven days, they were used for the flash of a commercially available 24-shot single-use camera. The flash was used by pressing the shutter button every 30 seconds in a room kept at 20±2° C. And, charge-up time (time required for recharging the flash to take the 24th shot—duration from pressing the shutter to illumination of a pilot lamp for indicating the completion of recharging) was measured with n=10. The results are shown in Table 1 with the recharging time of the conventional embodiment determined as 100.

TABLE 1

| | Anode Zn (g) | Cathode $MnO_2$ (g) | Capacity ratio ($N_E/P_E$) | Area ratio ($P_A/N_A$) | Charge-up time (Relative value) |
|---|---|---|---|---|---|
| Embodiment 1 | 0.644 (0.528) | 1.71 (0.527) | 1.00 | 1.82 | 97 |
| Embodiment 2 | 0.770 (0.631) | 1.71 (0.527) | 1.20 | 3.22 | 93 |
| Embodiment 3 | 0.930 (0.763) | 2.40 (0.739) | 1.03 | 2.39 | 81 |
| Embodiment 4 | 1.08 (0.886) | 2.40 (0.739) | 1.20 | 4.11 | 84 |
| Embodiment 5 | 1.16 (0.951) | 3.08 (0.949) | 1.00 | 3.55 | 95 |
| Embodiment 6 | 1.28 (1.05) | 3.08 (0.949) | 1.11 | 5.48 | 85 |
| Embodiment 7 | 1.44 (1.18) | 3.77 (1.16) | 1.02 | 5.15 | 90 |
| Embodiment 8 | 1.57 (1.29) | 4.11 (1.27) | 1.02 | 8.24 | 94 |
| Embodiment 9 | 1.69 (1.39) | 3.77 (1.16) | 1.20 | 7.10 | 93 |
| Comparative Embodiment 1 | 1.57 (1.29) | 4.11 (1.27) | 1.02 | 10.10 | 122 |
| Comparative Embodiment 2 | 0.512 (0.420) | 1.71 (0.527) | 0.80 | 1.82 | 154 |
| Comparative Embodiment 3 | 1.35 (1.11) | 3.77 (1.16) | 0.96 | 7.10 | 135 |
| Conventional Embodiment | 1.52 (1.25) | 3.68 (1.13) | 1.11 | 9.16 | 100 |

In Table 1, numerical values given in parentheses in connection with the anode indicate a theoretical capacity (Ah) of the anode and calculated from Zn 1.00 g=0.820 Ah. And, numerical values in parentheses of the cathode indicate a theoretical capacity (Ah) of the cathode and calculated from $MnO_2$ 1.00 g=0.308 Ah.

It is apparent from Table 1 that the alkaline dry cell according to the invention can have a shorter time to get ready for flashing than the comparative and conventional embodiments. Besides, an amount of the active material can be decreased as compared with the conventional cell, so that an inexpensive cell can be provided.

As described above, the alkaline dry cell of the invention can take a large current temporarily and has characteristics suitable as, for example, power for the flash of a single-use camera. Besides, it is economically advantageous because the active material can be used in a small amount.

What is claimed is:

1. An AAA alkaline dry cell comprising
   a hollow cylindrical cathode depolarizing mixture having electrolytic manganese dioxide as an active material and a gel anode having zinc alloy powder as an active material which are placed with a cylindrical separator therebetween in a metallic cathode can which is a closed-end cylinder and doubles as a cathode terminal, and
   a metallic anode current collector which is inserted into the gel anode, wherein
   the electrolytic manganese dioxide is in an amount of 1.71 g to 4.11 g,
   the zinc alloy powder is in an amount of 0.65 g to 1.69 g,
   a theoretical capacity ratio ($N_E/P_E$) between the anode and the cathode is in a range of 1.0 to 1.20, and
   a contact area ratio ($P_A/N_A$) between an anode-opposed area of the cathode depolarizing mixture and a contact area of the current collector against the gel anode is in a range of 1.82 to 5.48.

2. The alkaline dry cell according to claim 1, wherein the contact area ratio ($P_A/N_A$) is in a range of 1.82 to 5.15.

3. The alkaline dry cell according to claim 1, wherein the contact area ratio ($P_A/N_A$) is in a range of 1.82 to 4.11.

4. An alkaline dry cell comprising
   an anode including a gel anode and a metallic anode current collector inserted in the gel anode, where the gel anode comprises a zinc alloy powder;
   a cathode including a cylindrical cathode depolarizing mixture in a cylindrical closed-end metallic cathode can, where the cathode depolarizing mixture comprises an electrolytic manganese dioxide; and
   a cylindrical separator separating the gel anode and the cathode depolarizing mixture; wherein
   a theoretical capacity ratio ($N_E/P_E$) between the anode and the cathode is in a range of 1.0 to 1.20, and
   a contact area ratio ($P_A/N_A$) between an anode-opposed area of the cathode depolarizing mixture and a contact area of the anode current collector against the gel anode is in a range of 1.82 to 5.48.

5. The alkaline dry cell according to claim 4, wherein the contact area ratio ($P_A/N_A$) is in a range of 1.82 to 5.15.

6. The alkaline dry cell according to claim 4, wherein the contact area ratio ($P_A/N_A$) is in a range of 1.82 to 4.11.

7. A method of making an alkaline dry cell, the method comprising
   placing a cathode depolarizing mixture into a cathode can; and
   forming the alkaline dry cell of claim 1.

8. A method of using an alkaline dry cell, the method comprising powering a flash camera with the alkaline dry cell of claim 1.

9. A method of making an alkaline dry cell, the method comprising
   placing a cathode depolarizing mixture into a cathode can; and
   forming the alkaline dry cell of claim 4.

10. A method of using an alkaline dry cell, the method comprising powering a flash camera with the alkaline dry cell of claim 4.

* * * * *